United States Patent [19]

MacFarlane

[11] Patent Number: 4,839,575
[45] Date of Patent: Jun. 13, 1989

[54] ALTERNATOR REGULATOR HAVING OUTPUT MONITORING AND LIMITING CONTROLS

[75] Inventor: Alistair A. MacFarlane, East Kilbride, Scotland

[73] Assignee: Marathon Electric Manufacturing Corporation, Wausau, Wis.

[21] Appl. No.: 897,134

[22] Filed: Aug. 15, 1986

[51] Int. Cl.[4] .......................... H02H 7/06; H02P 9/00
[52] U.S. Cl. ........................................ 322/25; 322/28; 322/99; 361/20; 361/21
[58] Field of Search ....................... 322/25, 27, 28, 99; 361/20, 21; 123/179 A

[56] References Cited

U.S. PATENT DOCUMENTS

| | | | |
|---|---|---|---|
| 3,564,391 | 2/1971 | Dinger | 322/25 |
| 4,143,313 | 3/1979 | Arendt | 322/99 X |
| 4,349,854 | 9/1982 | Mori et al. | 322/28 X |
| 4,401,936 | 8/1983 | Van Opijnen | 322/28 X |
| 4,500,828 | 2/1985 | Nishihara | 322/28 X |
| 4,564,916 | 1/1986 | Hori et al. | 123/179 A X |

Primary Examiner—R. J. Hickey
Attorney, Agent, or Firm—Andrus, Sceales, Starke & Sawall

[57] ABSTRACT

An alternator regulator includes a status sensor connected to monitoring the connection of a voltage sensor to the alternator and a separate current limited monitor unit to regulate the output in accordance with the alternator current output. The sensor monitor unit includes a continuity circuit detector coupled to the voltage sensor and operable to continuously monitor the state of the connection to the alternator. A fault in the circuit connection such as a loose terminal, a broken lead or other such faults, opens the continuity circuit and generates a signal which drive the regulator off and terminates operation of the alternator, thereby protecting the alternator from possible destruction. A voltage/current mode selector receives a voltage related signal and a current related signal. A signal comparator is coupled to the voltage related signal and the sensed current related signal and generates a logic control signal applied to the selector to transmit one of the two signals. If the voltage drops, the current control is automatically triggered at a selective level to control the alternator output in accordance with the current output. The current limit control will limit the alternator output when zero voltage is occasioned by a short circuit condition. The conjoint control effected by the separate status sensing monitor positively shuts down the alternator, preventing operation of the current mode and insuring total protection of the alternator system.

21 Claims, 2 Drawing Sheets

ALTERNATOR REGULATOR HAVING OUTPUT MONITORING AND LIMITING CONTROLS

BACKGROUND OF THE PRESENT INVENTION

The present invention is particularly directed to an alternator regulator having output monitoring and limiting controls, and particularly to a regulated alternator having current limit means and a loss of parameter monitoring means.

The output of alternators may be automatically regulated in accordance with certain sensed parameters of the alternators. Engine driven alternators for example generally include voltage regulators for monitoring, establishing and maintaining a constant output voltage with variation of load speed and the like. In such regulated systems, current limit systems may be necessary and provided to prevent the output current from rising above a preselected maximum level. Generally, current sensor units detect excessive current conditions, out of phase currents and the like for monitoring the significant operation of the regulator. Such systems do not however provide a means for accurately detecting a fault in the sensor units or circuits such as a break in the sensing lead, a loose terminal in the sensing circuit or like fault which effectively opens the sensing circuit. The sensed voltage will drop to zero when an open circuit condition exists in the sensor unit.

With the regulator driven from a separate power supply such as a permanent magnet generator, the regulator responds to the output of the voltage monitoring unit regardless of the actual source of the monitoring signal. In particular, a break in a sensing lead or a loose connection of a sensing lead appears as a low voltage condition. The voltage sensor unit signal then demands increased excitation of the alternator in an attempt to increase the voltage output of the alternator. This will increase all of the voltage and available current with a disasterous consequence within the main alternator and/or the connected loads. Full forcing operation within the regulator and on the exciter may also create damage within such components.

If the regulator sense a zero voltage condition, the prior art generally immediately responds with means to shut down the alternator.

Although such a system may be used to guard against abnormal current, the prior art systems do not provide normal voltage regulation under certain conditions and current regulations under alternate conditions while maintaining appropriate current limit response in the event of a damaging current failure. Thus, the prior art systems do not appropriately distinguish between the various conditions which can create an essentially zero output voltage to the regulator, namely, a short circuit condition of the alternator and alternatively an open detection circuit both of which signal the regulator to increase the output of the alternator, with appropriate control action depending upon the source of the fault.

SUMMARY OF THE PRESENT INVENTION

The present invention is particularly directed to a monitoring system having means for separately monitoring the state of the connections to a voltage sensor unit and a separate current limiting monitor unit. In addition, a unique continuity sensor detector unit monitors the loss in the sensor unit. In addition, an automatic voltage/current modulating control is provided for maintaining appropriate control in the presence of different circuit states. More particularly, in accordance with one embodiment of the present invention, a sensor continuity detector is coupled to the voltage sensor and operable to continuously monitor the state of the connection to the alternator. If there is a fault in the sensing circuit connection such as a loose terminal, a break in a sensing lead or other such faults, the continuity detector opens and generates a signal which drive the regulator off and terminates operation of the alternator, thereby protecting the alternator from possible destruction.

The regulator further includes a voltage/current mode selector having a voltage level input connected to receive a voltage related signal and a current level input connected to receive a current related signal. A comparator means is also coupled to the voltage related signal and the sensed current related signal. The selector is constructed to establish a voltage sensitive control under certain relative signal conditions and to establish a current responsive control under another relative signal conditions. Thus, the sensed signal which establishes the larger control signal and controls the regulation. The voltage signal normally controls. The current increases above a selected level, the current control is automatically triggered to control the alternator output in a predetermined regulated manner and to thereby establish and limit the current output. The current limit control is effective from full output voltage to zero voltage. Any requirement to increase the alternator output above this limit will cause the voltage to fall to maintain the output current at this time. Thus, if the voltage signal should change indicating a low or zero output voltage because of an open condition in the voltage sensing circuit, the selector system would tend to drive the regulator into a current regulated mode. However, the conjoint control effected by the separate state sensing monitor positively shut down the alternator, preventing operation of the current mode and insuring total protection of the alternator system.

In a preferred and a unique construction, the alternator voltage sensor network includes an appropriate voltage sensing resistive network interconnecting each phase signal to a common reference. The rectified output of the permanent magnet generator is connected to establish a D.C. current through the alternator windings and the voltage resistive network. As voltage dividing network is connected in the D.C. connection and includes a connection to one side of a detection integrating amplifier. The voltage related signals are summed in a summing network and applied through a voltage dividing network to the opposite side of the integrating amplifier. A D.C. path is thereby established from the voltage sensor network through the input of the sensing amplifier. With the input to the voltage sensor complete, a continuous D.C. current path is maintained from and through the voltage detection circuit. The state of the continuity sensing circuit indicate an appropriate protection of the voltage. If there is any open position in any part of the voltage sensor, a corresponding opening or change in the signal is detected in the continuity network to the integrating amplifier resulting in a switching or a turn-off signal from the amplifier. The output of the amplifier is coupled to drive the regulator hard off, thereby turning off the alternator and insuring the desired protection of the system including the alternator and other associated equipment and providing an indication to the operator of the necessity for appropriate system correction.

The current limited modulator unit is also coupled into the regulator and monitors current conditions such as a short circuit state for providing a desired control under such conditions. In the illustrated embodiment of the invention, a unique current limited modulating system is automatically established to provide an automatic current limit control at a selected output voltage level. In particular, individual current sensing means are coupled to each phase and provide appropriate current level signals. The signals are coupled to a peak detector unit to develop an output signal corresponding to the peak current output of any given phase. The signal is converted to a related voltage signal. A comparator unit is coupled to the current voltage signal and to the alternator voltage signal. The current voltage signal and the alternator voltage signal are also simultaneously applied to a mode selection switch such as a suitable analog switch unit having an output coupled to control an alternator driving element. The output of the comparator unit is also coupled to control the setting of the analog switch and in particular to transmit either the alternator voltage signal or the current voltage signal. The comparator is selected and designed to provide appropriate transmission of the voltage signal under predetermined relative levels of the voltage signal and the current voltage signal and to provide for transmission of the current voltage signal under other relative conditions. The output of the analog switch is connected in common with the output of the continuity detection amplifier to the input of the alternator regulator. The output of the voltage or the current voltage signal operates the regulator to provide a desired control of the operation of the alternator system and the output of the alternator. However, the continuity detection signal is an overriding master signal which will drive and hold the regulator driver off to effectively disable the regulator and thereby shut down the alternator.

The inventor has discovered that the combination provides the desired protection of the total system and particularly the very expensive alternator. Thus if appropriate control is not maintained, or if there is an appropriate lack of sensing, the regulator will be signaled to continuously drive the alternator to an ever higher output with a great probability of severe damage if not total destruction of the alternator system and/or the interconnected loads. The present invention however permits a desired current limit control without system shutdown under certain conditions such as motor starting or other heavy momentary loading of the alternator. However, all particularly dangerous conditions are monitored and prevented.

The present invention thus provides a significant improvement in the monitoring of the various parameters of the alternator regulator protective system including the state of the sensor connection as well as damaging levels of the alternator output current which can be readily applied in an economic fashion with present day technology.

BRIEF DESCRIPTION OF DRAWINGS

The drawings illustrate the best mode presently contemplated of carrying out the invention.

In the drawings.

DESCRIPTION OF THE ILLUSTRATED EMBODIMENT

Figure 1:
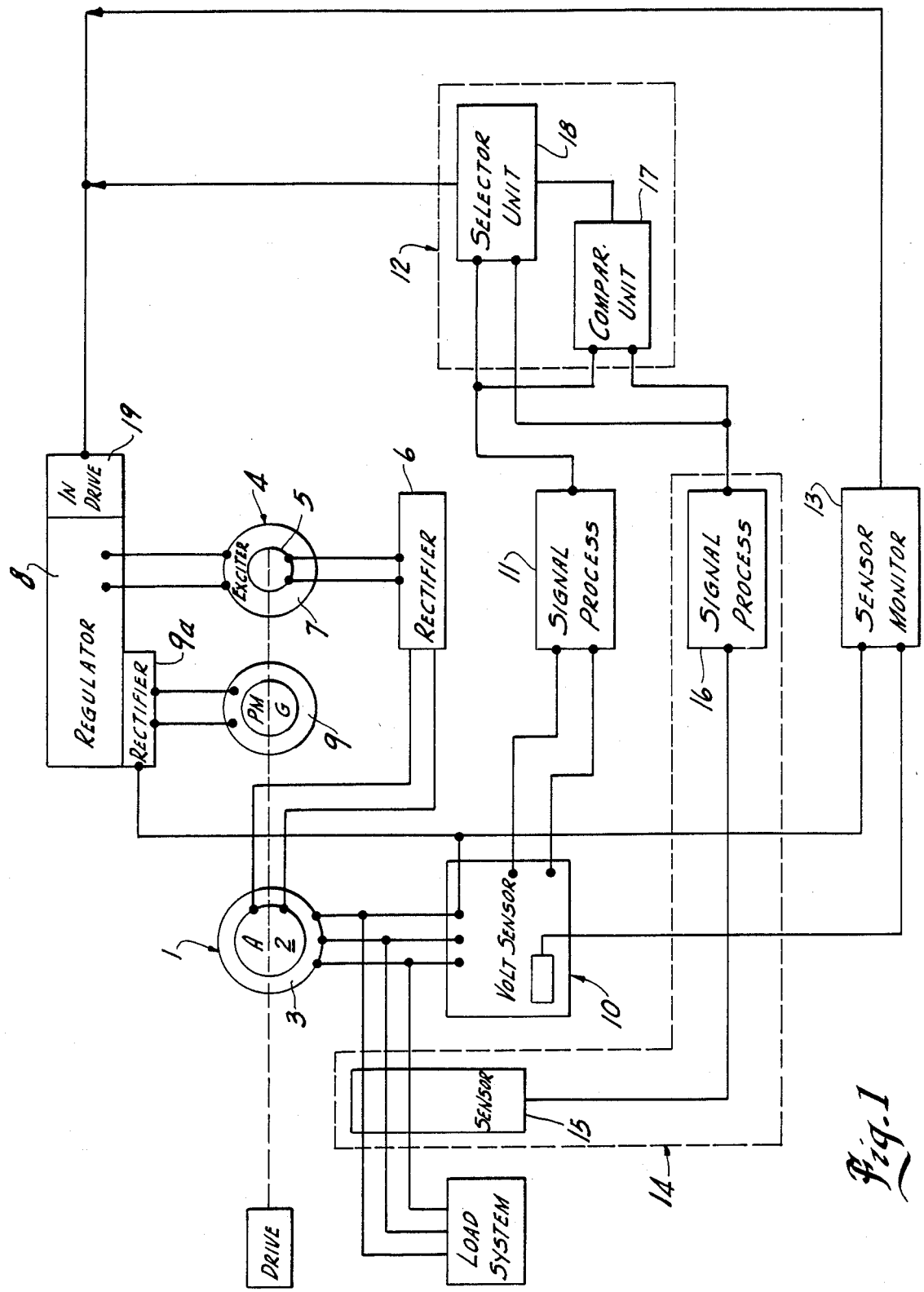
FIG. 1 is a simplified block diagram of an alternator incorporating a regulator having a current limited modulator and a sensor loss detection unit connected to conjointly control the operation of the alternator system.

Referring to the drawings and particularly to FIG. 1, an engine driven alternator 1 is schematically illustrated having a rotating field 2 coupled to a three phase output winding 3. The field 2 is energized from an exciter generator 4 having an output winding 5 which is driven in synchronism with the alternator. The output winding 5 of the exciter 4 is coupled through a full wave bridge rectified 6 to impress the appropriate DC current on the rotating field 2 of alternator 1. The excitation of the field winding 7 of exciter 4 is controlled by a regulator 8 to maintain the output of the alternator 1 in a stable desired mode or output condition under varying sensed parameters. The regulator 8 is powered from a separate suitable logic supply shown in the illustrated embodiment as a separate permanent magnet generator 9. The generator 9 is illustrated having a permanent magnet rotor coupled to the alternator 1 and exciter rotor and having an output winding establishing a separate power supply for powering the regulator. A full wave rectifier 9a provides a direct current (D.C.) supply line to the regulator. A voltage sensor unit 10 is coupled to the output of the alternator 1 and provides a voltage signal which is processed in a signal processor 11 to provide a corresponding signal proportional to the output voltage. The voltage sensor unit 10 is connected through a special mode selection unit 12 as an input to the regulator 8 to control the excitation of the exciter 4 and thereby the output of the alternator 1 to maintain a preselected voltage condition.

The illustrated alternator system is typical of various engine driven regulated alternators as shown in the prior art. A particularly satisfactory alternator including a unique permanent magnet generator construction is more fully disclosed in the copending application of Millis Parshall, entitled "Permanent Magnet Generator Apparatus", filed on even date herewith and assigned to a common assignee herewith. Similarly, a particularly satisfactory voltage signal processing circuit is described in the inventor's co-pending application entitled "Regulated Alternator With Positive Fault Related Shut Down Apparatus", filed on even date herewith.

For details of the voltage regulator as such, the alternator, the exciter and the permanent magnet generator and the like, reference may be made to such copending application and other available literature.

The present invention is particularly directed to the provision of a unique sensor monitoring unit 13 coupled to the voltage sensor unit 10, a current limited modulator unit 14 and the conjoint control of the regulator 8 by such units.

Figure 2:
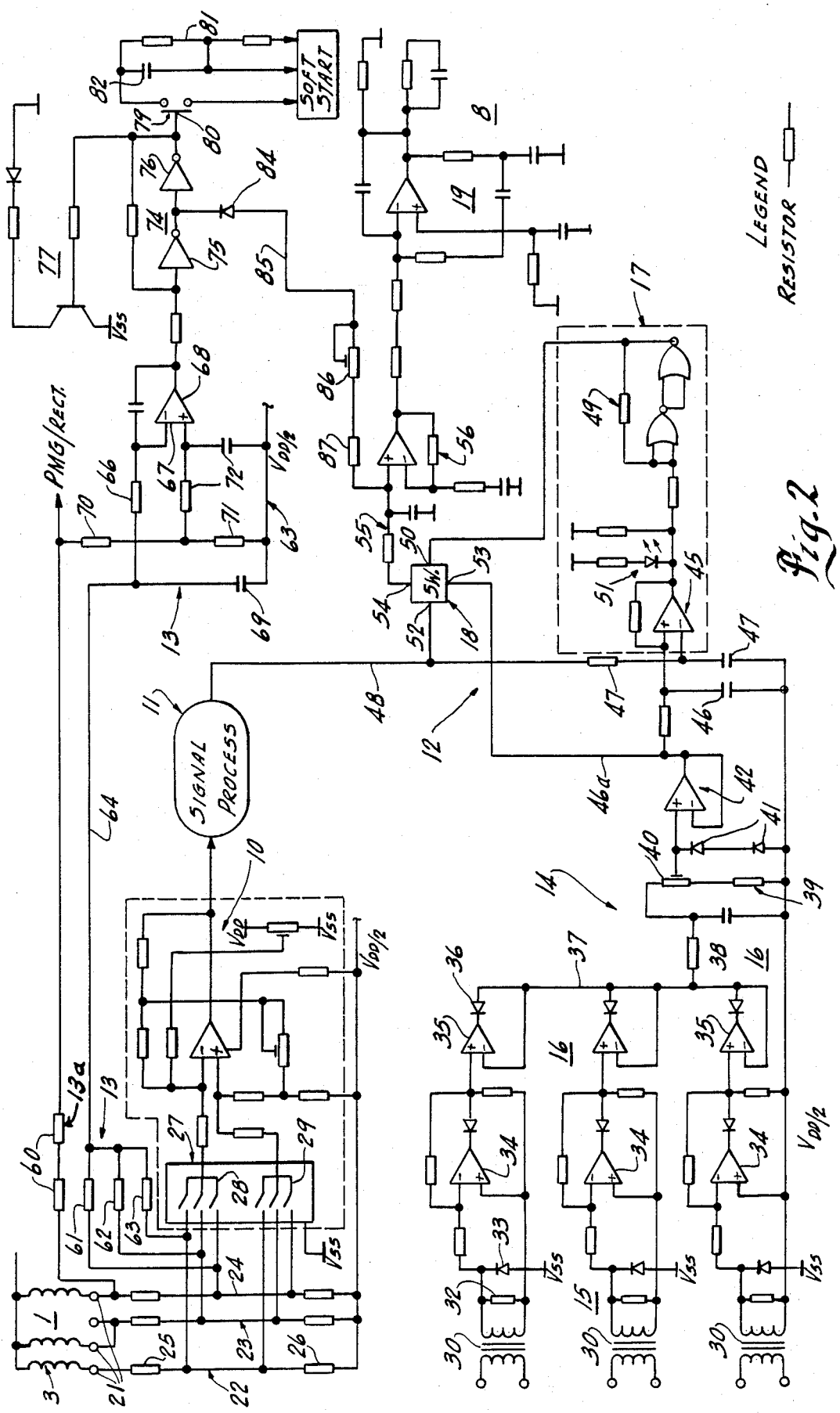
FIG. 2 is a circuit diagram illustrating a preferred construction of a control circuit for the current limited control unit and the sensor loss detection unit.

The monitor unit 13 is specially constructed to sense the loss of a sensing signal connection between the voltage sensor unit 10 and the output of the alternator 1. The rectified output of the permanent magnet generator 9 is connected to the sensing network via series connected resistor chain 13a as shown in FIG. 2. A low level D.C. current flow is thereby established through the alternator windings in series with the inputs to the voltage sensing network 10. The D.C. current flow in each branch is monitored by the connection of the sensor to the voltage sensing network. The output of the sensor monitor unit 13 is connected to the voltage regulator 8 to drive the regulator 8 hard off, and preferably rapidly shut down the alternator output. The output of voltage sensor unit 10 would tend to drive the regulator to increase the output of the alternator 1 upon a loss of the sensing connection to the alternator 1. This could not only damage the alternator 1 but the load systems coupled to the alternator. The sensor monitoring unit 13 prevents such action and damage. There are certain conditions when an abnormally high current, for a limited period, may be desired subject to a current limit control. Under such systems, the voltage may drop effectively to zero. For example, a short circuit condition will establish a zero voltage output to the voltage sensor unit 10. This would tend to drive the regulator 8 to provide a maximum output from the alternator 1, which again might create a damaging condition. In accordance with the illustrated embodiment of the present invention, the current limited control unit 14 includes current level sensor unit 15 coupled to the alternator output and connected to a signal processor 16 to establish and provide a voltage control signal related to the level of the output current. The output of the current limited sensor unit 14 is connected to the voltage regulator 8 through the mode selection unit 12 to provide an alternator modulating control of the output of the alternator 1. Selection unit 12 includes a signal comparator 17 to determine which signal shall be transmitted to control the regulator 8 and a selector switch 18 to transmit the proper signal.

As diagrammatically illustrated in FIG. 1, the voltage level sensor unit 10 and the current level sensor unit 14 are connected to the signal comparator unit 17 and also to the signal selector unit 18. The comparator unit 17 monitors the relationship between the current output signal level and the voltage signal level as received from their respective sensor units 11 and 16. The output of the comparator unit 17 is alternate control signals, one of which is creates a voltage control mode and the other of which creates a current control mode. The output of the comparator unit 17 is coupled to the selector unit 18 and sets the selector unit 18 to transmit the voltage related signal or alternately the current related signal depending upon the state of the comparator output.

The regulator 8 includes a drive circuit 19 which has a multiple input for receiving of various parameter-related signals, including a common signal input connected to the selector unit 18 and from the sensor monitor unit 13. The drive unit 19 is normally driven in accordance with the input from the signal selector unit 18 which provides either a sensed voltage or a current limit control of the excitation generator 4. As previously noted however, in the event of a loss of a sensing signal from the voltage sensor unit 10, the drive unit 19 is driven hard off to shut down the alternator regardless of the signal from the selector unit 18.

In the absence of a turn-off signal from sensor monitor 13, the selector unit 18 establishes a normal voltage regulation of the output of the alternator 1. As the current output of the alternator 1 rises, the regulator 8 will automatically be switched over to current limit regulation of the output of the alternator 1.

If the voltage signal drops to zero, the regulator action will depend upon the cause of such zero voltage signal. If it rises as a result of the loading on the alternator, such as a short circuit or an effective short circuit, the control 8 will control the output current to a safe maximum limited level. However, if the fault is in the connection of the voltage sensor unit 10, the system will shut down until the fault in the sensing circuit connection of the voltage sensor unit is corrected.

Although within the broad aspects and teaching of the present invention, the sensor monitor unit 13 and the current limited control unit 14 and the interconnection between the several elements may of course be of any suitable design and/or construction, a preferred and particularly unique circuit for the several components and their interconnection is shown in FIG. 2 and presently described as follows.

Referring particularly to FIG. 2, a sensing connection of the voltage sensor unit 10 is schematically illustrated. Three phase terminals 21 are connected to the alternator output winding 3. Each sensing terminal 21 is connected to common regulator D.C. reference by a corresponding sensing branch circuits 22, 23 and 24. Each of the three branches is similarly constructed. Referring to branch 22, a pair of series connected resistors 25 and 26 define a common connection or node providing a voltage signal proportional to the output voltage at the corresponding phase line. In the illustrated embodiment of the invention, a multiplex unit 27 of sensor 10 has first and second sets 28 and 29 of three input switches connected one each to the common nodes of the three branches 22-24. The multiplex unit 27 selectively interconnects the input switches to sense, in sequence, the phase-to-phase output voltages of the alternator. The signal is processed in any suitable manner to develop a voltage level signal proportional to the output voltage of the alternator 1. The multiplexing of the signals and the generating of a related output signal will be readily provided by those skilled in the art and no further description thereof is given herein.

The voltage related signal in FIG. 1 is coupled to the voltage signal processer which establishes the voltage signal to the voltage/current selector unit 18 and also to the comparator unit 17. Under normal conditions the voltage signal is transmitted via the selector unit 18 to the drive circuit 19 and the alternator output is regulated to produce a desired constant output voltage. Under certain conditions such as motor starting and the like, the voltage may drop with a substantial increase in current. Temporary operation under the latter conditions may be acceptable, and even desirable to permit operation of the system without shut down. The present invention permits operation under a current control mode to permit selected low voltage operations as follows.

The current limited sensor unit 14 and, particularly the current sensor 15 illustrated in FIG. 2 includes similar individual current transformers 30 coupled to monitor the current in each phase of the output of the alternator 1. The output circuit of each current transformer 30 is similarly constructed and the circuit for a transformer of one phase is described in detail, with corresponding primed member applied to corresponding elements of the other phase circuits.

A suitable burden resistor and protective diode 32-33 are connected across the output of the transformer 30. A voltage rectifier 34 is connected in parallel with the output of the current transformer. The output of the rectifier is connected to a peak signal detector 35 which is connected by a coupling diode 36 to a common output line 37. With each of the current transformer circuits connected to the common output line 37, the highest peak signal is applied as the current control signal. A filter network 38 is coupled to the common output line 37 to smooth the output signal and provide a voltage essentially proportional to the highest peak current of the three phase current output of alternator 1. A voltage dividing network 39 is connected across the filtering capacitor of the filtering network 38 and includes an adjustable potentiometer 40, the output of which is connected as the output voltage of the current control unit. The output line connected to the potentiometer 40 is clamped by diodes 41 to a reference voltage line to limit the output voltage signal to a predetermined maximum. The limited voltage signal provides a maximum level control to the voltage regulator 8 and thereby limits the regulated current output of the alternator 1. As more fully presently developed, the current-related voltage signal below such clamped level provides a limiting control to the regulator.

The clamped voltage signal is coupled through a voltage follower 42 to the voltage/current selector unit 12 and the voltage/current comparator unit 17. The current-related signal is a voltage signal proportional to the alternator output current and provides a varying voltage signal having a range directly related to the range of the voltage signal from the voltage sensor unit 10. The signals are compared in unit 17 to determine which signal shall be transmitted to the driver 19.

The comparator unit 17 is shown constructed to provide a digital logic output, with a high level signal generating a voltage selection mode and a low level signal generating a current level mode.

The comparator 17 includes an input amplifier 45 connected as a differential amplifier. The positive input of the amplifier 45 is connected by a filter circuit 46 to the output line 46a of the follower 42. The filter circuit 46 filters transient signals. The filtered output is applied as a first input to the differential amplifier 45. The second or negative input of the comparator amplifier 45 is similarly connected through a filter circuit 47 to eliminate transient signals from the input line 48 to the differential comparator unit 45. The output of the differential comparator is therefore directly controlled by the relative level of the voltage signals from the voltage sensor unit and the current sensor unit.

The output of the differential amplifier 45 is connected as an input to a Schmitt trigger circuit 49 which provides a rapid changing signal between two logic level outputs or states. The Schmitt trigger 49 is shown as a conventional logic circuit which will be readily provided by those skilled in the art and no further description is therefore given. The output of the Schmitt trigger 49 is connected to a control input terminal at 50 of the signal selector unit 18.

The output of the amplifier is also coupled to an indicating unit shown as a simple LED lamp circuit. In the normal voltage regulating mode the lamp circuit is back biased and the lamp turned off. When the output of the differential amplifier switches to provide a current mode selection output, the lamp circuit 51 is released and the LED energized up to provide a visual indication that the regulator 8 is in the current limit mode.

In the illustrated embodiment of the invention, the signal selector unit 18 is shown as an integrated analogue circuit and constitutes an analogue changeover switch. The integrated circuit 18 includes first and second signal inputs 52 and 53 connected respectively to the signal line 48 from the voltage level sensor unit 10 and to the signal line 46a from the current level sensor unit 14 and particularly follower 42. The output terminal 54 of the integrated change over switch is selectively connected to one or the other of the two inputs 52 and 53, depending upon the logic level of the signal at a control terminal 53, which is connected to the output of comparator unit 17. In the illustrated embodiment, the output of the selector unit 18 corresponds to that of the voltage signal line 48 until such time as the current level voltage signal applied to the comparator unit 17 rises to a sufficient level to switch the differential amplifier 45 and the output turns on the current mode lamp and fires the Schmitt trigger 49 to reverse the logic level signal to the selector unit 18. Thereafter, a current related voltage signal is transmitted to the output driving circuit, and control the alternator output to a constant current.

The output voltage signal from the selector unit 18 is filtered by filter 55 and coupled by a amplifier 56 to the driving circuit 19. The buffer amplifier 56 is also connected to the output of the sensor unit 13.

The D.C. voltage supply to the regulator from the generator 9 is connected via a protective resistor chain 13a, including a pair of resistors 60, to one voltage sensing terminal 21. The current signal from each phase is summed through the low resistance of the windings 3 of the alternator 1. High-valued resistors 61-63 connect the sensing switches to a common signal signal line 64. The line 64 is connected via a coupling resistor 66 to the negative input 67 of an operational integrating amplifier 68. A filtering capacitor 69 removes transients and provides an average D.C. signal to the negative input. A second divider voltage formed by a pair of resistors 70 and 71 is fed from the rectified DC signal connection of the regulator supply and particularly the permanent magnet generator to the alternator terminal. The junction of resistors 70-71 is connected by a filter resistor and capacitor 72 to the positive input of the integrating amplifier. Resistor 70 and 71 are selected with a resistance such that the voltage across resistor 71 is a proportion of the voltage at the summing point of the signal applied to the negative side of the operational amplifier.

If any connection of the phase sensor leads is lost such as a result of a lead breakage, lead disconnection or the like, the voltage at the summing point or line 64 will drop a related level. If a single lead connection is lost, the voltage drops to approximately ⅔ the previous value. If two leads are lost, the signal drops to approximately ⅓ the previous or original value. Either of the latter two conditions will cause the integrating amplifier 68 to integrate to a high level output and signal the regulator to shut down the alternator regardless of the signal from unit 18 or other source, as follows.

A Schmitt trigger unit 74 is connected to the output of the integrating amplifier 68. The illustrated Schmitt trigger is a well known circuit consisting of a pair of series connected inverters 75 with 76 with an appropriate feedback resister network. An LED lamp circuit 77 is connected to the output of the inverter to visually indicate actuation by the sensor loss circuit.

An analogue switch 79 is coupled to the output of the Schmitt trigger 74. The analogue switch 79 is diagrammatically illustrated having a control input 80 connected to the Schmitt trigger and operable in response to an appropriate input signal to close the circuit switch 79, which is connected to the reference voltage supply consisting of a voltage divider branch 81 and a start control capacitor 82 in parallel with the resistor of the branch 81. The circuit 80-82 is connected to transmit a start signal to the operational amplifier 19 at initial start after the shutdown of the alternator 1; thus, switch opens and the R-C network produces a gradual start signal for soft start of the alternator.

A diode 84 connects the output of the first inverter 75 of the Schmitt trigger 74 to the output signal line 85 of the sensor monitor unit. A potentiometer 86 and resistor 87 are shown connected in series in the signal line 85 which is connected to the input of the buffer amplifier 56 in common with the voltage control signal from selector unit 18. The intermediate output of the inverter is a low logic level signal and the connection through the now forward biased diode clamps the input of the input amplifier 56. Thus, regardless of the voltage control signal impressed on amplifier 56, the output is low and the regulator driving circuit 19 operates to turn off the regulator 8 and thereby effectively shut down the output of the alternator 1.

The combined action is therefore to switch the regulator hard off.

In the illustrated embodiment of the invention, the analogue switch 79 is shown connected in circuit to the start switch circuit 81–82. When the sensing circuit loss is re-established, the capacitor 82 is connected between the voltage supply and reference to reestablish the normal voltage regulating circuit operation. The start control capacitor 82 is connected between the common node of the voltage divider 81 and the supply reference line to provide an essentially gradual build-up in the voltage applied as the input through the buffer amplifier to re-establish the circuit of the drive amplifier. The slow charging capacitor 82 thus establishes a relatively soft start of the alternator 1 and prevents sudden loading and the like.

Various modes of carrying out the invention are contemplated as being within the scope of the following claims particularly pointing out and distinctly claiming the subject matter which is regarded as the invention.

I claim:

1. A voltage regulator for controlling an alternator establishing an electrical output including an output voltage and an output current to a connected load, comprising
   a control circuit means having output means controlling the electrical output of such alternator,
   a current sensing means having connection means adapted to be connected to the output of the alternator and establishing a current-related signal proportional to the level of the output current from the alternator, a voltage sensing means having an input means and connection means adapted to connect said input means to the output of the alternator and establishing a voltage-related signal proportional to the level of the voltage output of the alternator, a voltage/current selection means having a first input connected to said current sensing means and a second input connected to said voltage sensing means and having an output means for controlling transmission of signals from said sensing means for controlling said alternator, said selection means transmitting a single one of said signals from said sensing means,
   a sensor continuity detector connected to the connection of said voltage sensing means to said alternator and operable to separately detect the lack of continuity in the connection means of the voltage sensor means to said alternator and to thereby detect an essentially open circuit condition in said connection means, and
   means connecting said sensor continuity detector to said control circuit means to control said alternator and override the signal from said selection means.

2. The voltage regulator of claim 1, wherein said selection means includes a comparator means having first and second inputs connected respectively to said current level sensing means and said voltage sensing means and having an output connected to actuate said selection means in accordance with the relative input signals at said first and second inputs.

3. The voltage regulator of claim 1, wherein said sensor continuity detector is operable to shutdown said alternator.

4. The voltage regulator of claim 1, wherein said control circuit means includes
   alternator excitation level control means having exciter input means and controlling the excitation of the alternator in accordance with the signal level at said exciter input means, said input means adapted to receive a variable level control signal from said selection means to vary the excitation in accordance with the voltage signal to establish and maintain a selected output voltage and in accordance with the current signal if said current level rises above a selected level relative to said voltage signal.

5. The voltage regulator of claim 4, wherein said selection means includes a comparator unit connected to said current sensing means and connected to said voltage sensing means to receive the corresponding control signals from said sensing means and operable to provide a first control signal demanding a voltage control and a second control signal demanding a current control related to the relative levels of the outputs of said sensing means.

6. The voltage regulator of claim 1, wherein said continuity detector includes a D.C. current supply connected to establish a D.C. current through said alternator and said input means, said continuity detector being connected to the input means and establishing a control signal in response to a change in said D.C. current level, and means connecting said detector to limit operation of the alternator in response to a selected change in said D.C. current flow.

7. The regulator of claim 6, wherein said D.C. current supply is a permanent magnet generator and a full wave bridge rectifier connected to the output of said generator to establish said D.C. current supply, said continuity detector including means connected to said rectifier to establish a D.C. current flow through said alternator and sensor means, and means to monitor the level of said D.C. flow and thereby the continuity of the connecting of the voltage sensing means to the alternator.

8. The regulator of claim 6, wherein said regulator is adapted to control a polyphase alternator, said continuity circuit detector includes having separate phase connection means for separately sensing the D.C. current in each phase connection to the alternator and establishing corresponding phase signals and means for combining said phase signals to form said control signal whereby said control signal changes in response to a change in any phase connection.

9. The regulator unit of claim 8, wherein a plurality of resistor means connect said D.C. current supply to said sensor continuity detector for establishing said D.C. current through said input means and said alternator, and having a voltage level sensing means having input means connected to said resistor means for detecting the level of said D.C. current.

10. The regulator unit of claim 8, wherein said continuity detector includes an integrating operational amplifier having a first input means and a second input means, a voltage dividing network including summing means to combine the phase currents and establishing a voltage signal proportional to the summated D.C. phase currents, and a reference level voltage means connected to said second input means.

11. A regulator for controlling an alternator,
a control means having an output means for controlling of the alternator and thereby the electrical output of the alternator,
a current sensing means having input means for connection to the output of the alternator and establishing a current-related signal proportional to the voltage output of the alternator,
a voltage sensing means having input means for connection to the output of the alternator and establishing a voltage-related signal proportional to the voltage output of the alternator,
a voltage/current selector means having input means connected to said current sensing means and to said voltage sensing means and having an output means and selectively connecting said output means to said current sensing means or said voltage sensing means, and signal level comparator means having input means connected to said current sensing means and to said voltage sensing means and having an output means connected to actuate said selector means in accordance with the level of the signals from said sensing means, said comparator means connecting said voltage sensing means to said output means and responsive to a voltage-related signal with said alternator producing a zero output to connect said current sensing means to said output means to limit the current and prevent a damaging current flow from said alternator.

12. The regulator of claim 11, wherein said comparator means compares the level of the signals from said sensing means and sets said selector means to transmit said voltage signal with said voltage signal above a selected level.

13. The regulator of claim 11, having a connection circuit means connecting said input means of said voltage sensing means to said alternator, and a sensor continuity detector operable to directly detect the continuity of said connection circuit means and an essentially open circuit condition at said input means of said voltage sensing means, and means connected to said input means connected to said selection means and to said sensor continuity detector and operable in response to a selected signal from said sensor continuity detector to essentially shut down said alternator.

14. The regulator of claim 11 for a polyphase alternator wherein said current sensing means includes a plurality of current signal branches, one for each phase and having a current input, each branch including a rectifying means and a peak detector producing an output corresponding to the amplitude of the branch, a smoothing circuit connected to said peak detectors to establish a variable D.C. voltage signal proportional to the peak current.

15. The regulator of claim 14, including an amplifier connected to said smoothing circuit and a clamp means connected to limit the input signal to said amplifier.

16. The regulator of claim 11, wherein said comparator unit includes a difference amplifier having first and second inputs connected to said sensing means, a triggered logic circuit connected to said difference amplifier to produce alternate logic output signals in accordance with the level of the signals from the sensing means.

17. The regulator of claim 16, wherein said comparator means includes is an integrated circuit switch having said control input connected to said triggered logic circuit.

18. A voltage regulator unit for regulating an alternator,
an output sensor means having an input means connected to the output of the alternator to sense the electrical output of the alternator and having processing means, conductors connecting said processing means and said input means to establish a related output signal, control means connected to said processing means, and operable to control the output of the alternator, a sensor continuity detector connected to the output sensor means and directly monitoring the physical continuity of the conductors between said input means and said processing means and establishing a control signal in response to an opening in said conductors from the input means to the output sensor means, limit means connecting said detector to said control means to signal said opening and thereby connection loss in said conductors, said regulator including a D.C. power supply, said detector including means connected to said power supply to establish a D.C. current flow through said alternator and said input means to said sensing means, and said detector monitors the level of the D.C. current flow and thereby the continuity of the coupling of the sensor input means to the alternator.

19. In combination, a generator unit and a voltage regulator for controlling an alternator establishing electrical output including an output voltage and an output current to a connected to a load, said regulator comprising
a control circuit means having output means controlling the electrical output of such alternator,
a current sensing means having input means adapted to be connected to the output of the alternator and establishing a current-related signal proportional to the level of the output current from the alternator,
a voltage sensing means having an input means adapted to be coupled to the output of the alternator and establishing a voltage-related signal proportional to the level of the voltage output of the alternator, a voltage/current selection means having a first input connected to said current sensing means and a second input connected to said voltage sensing means and having an output means for controlling transmission of signals from said sensing means for controlling said alternator, said selection means transmitting a single one of said signals from said sensing means,
a sensor continuity detector for connection to the input means of said voltage sensing means to said alternator and for separately detecting the lack of continuity in the connection means of the voltage sensor means to said alternator and to thereby detect an essentially open circuit condition in said connection means, means connecting said sensor continuity detector to said control circuit means to control said alternator and override the signal from said selection means, and said generator unit including a permanent magnet generator, a rectifier means connected to the output of said generator and establishing a D.C. power supply to said voltage regulator, said detector including means connected to said rectifier means to establish a D.C. current flow through said alternator and the input means to said voltage sensing means, and said detector includes a D.C. current sensing means monitoring the level of said D.C. current flow and thereby the continuity of the connection of the voltage sensing means to the alternator.

20. The regulator unit of claim 18, wherein said monitor means includes an integrating operational amplifier having a first input means and a second input means, a voltage dividing network including summing means to combine the phase currents and establishing a voltage signal proportional to the summated D.C. phase currents, and reference voltage means connected to said second input means.

21. The regulator unit of claim 18 having a logic D.C. voltage means, said detection means including resistor means connected said D.C. voltage means to said sensor means for establishing a D.C. current through said input means and the alternator, a voltage sensing means having input means connected to resistor means for detecting the presence of said D.C. current.

* * * * *

UNITED STATES PATENT AND TRADEMARK OFFICE
CERTIFICATE OF CORRECTION

PATENT NO. : 4,839,575

DATED : June 13, 1989

INVENTOR(S) : Alistair A. MacFarlane

It is certified that error appears in the above-identified patent and that said Letters Patent is hereby corrected as shown below:

Col. 10, line 7, after "current" delete "level"; Col. 12, line 9, after "includes" delete "is"; Col. 12, line 42, after "current" delete "to a".

Signed and Sealed this

Fourth Day of June, 1991

Attest:

HARRY F. MANBECK, JR.

*Attesting Officer*  *Commissioner of Patents and Trademarks*